(12) United States Patent
Nishihara et al.

(10) Patent No.: US 9,998,230 B2
(45) Date of Patent: Jun. 12, 2018

(54) OPTICAL TRANSMITTER, OPTICAL COMMUNICATION SYSTEM, AND OPTICAL TRANSMISSION/RECEPTION CONTROL METHOD

(71) Applicant: FUJITSU LIMITED, Kawasaki-shi, Kanagawa (JP)

(72) Inventors: Masato Nishihara, Kawasaki (JP); Toshiki Tanaka, Setagaya (JP); Tomoo Takahara, Kawasaki (JP); Ryou Okabe, Shinagawa (JP); Yutaka Kai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/654,847

(22) Filed: Jul. 20, 2017

(65) Prior Publication Data
US 2018/0034551 A1 Feb. 1, 2018

(30) Foreign Application Priority Data
Jul. 26, 2016 (JP) .................. 2016-145951

(51) Int. Cl.
*H04B 10/00* (2013.01)
*H04B 10/516* (2013.01)
*H04B 10/60* (2013.01)
*H04L 27/26* (2006.01)

(52) U.S. Cl.
CPC ......... *H04B 10/5161* (2013.01); *H04B 10/60* (2013.01); *H04L 27/2627* (2013.01)

(58) Field of Classification Search
CPC .................. H04B 10/548; H04B 10/07955

USPC ......................................... 398/140
See application file for complete search history.

(56) References Cited

U.S. PATENT DOCUMENTS

| 7,076,168 B1 * | 7/2006 | Shattil .............. H04B 10/25752 |
| | | 398/202 |
| 2004/0232985 A1 | 11/2004 | Itahara | |
| 2006/0078336 A1 * | 4/2006 | McNicol .......... H04B 10/25137 |
| | | 398/147 |

(Continued)

FOREIGN PATENT DOCUMENTS

| JP | 2002-223171 | 8/2002 |
| JP | 2003-332853 | 11/2003 |
| JP | 2010-147983 | 7/2010 |

*Primary Examiner* — Don N Vo
(74) *Attorney, Agent, or Firm* — Staas & Halsey LLP

(57) ABSTRACT

An optical transmitter includes an optical modulator to modulate light having a predetermined wavelength into an optical signal based on a data signal, a memory, and a processor coupled to the memory and the processor configured to modulate an input signal into a multi-carrier signal so as to generate the data signal, the multi-carrier signal including a plurality of subcarriers each to which a transmission capacity is allocated, acquire a first frequency distribution of an intensity of the multi-carrier signal, acquire a second frequency distribution of an intensity of the optical signal, control the modulating of the input signal into the multi-carrier signal to change a number of subcarriers of the multi-carrier signal, and control the optical modulator to adjust a modulation characteristic of the optical modulator so that a divergence between the first frequency distribution and the second frequency distribution is equal to or less than a predetermined value.

7 Claims, 16 Drawing Sheets

(56) References Cited

U.S. PATENT DOCUMENTS

2006/0127102 A1* 6/2006 Roberts .............. H04B 10/505
                                                398/182
2010/0159856 A1  6/2010 Kato et al.
2017/0214470 A1* 7/2017 Nishihara ........ H04B 10/07955
2017/0222725 A1* 8/2017 Bhandare ............ H04B 10/516

* cited by examiner

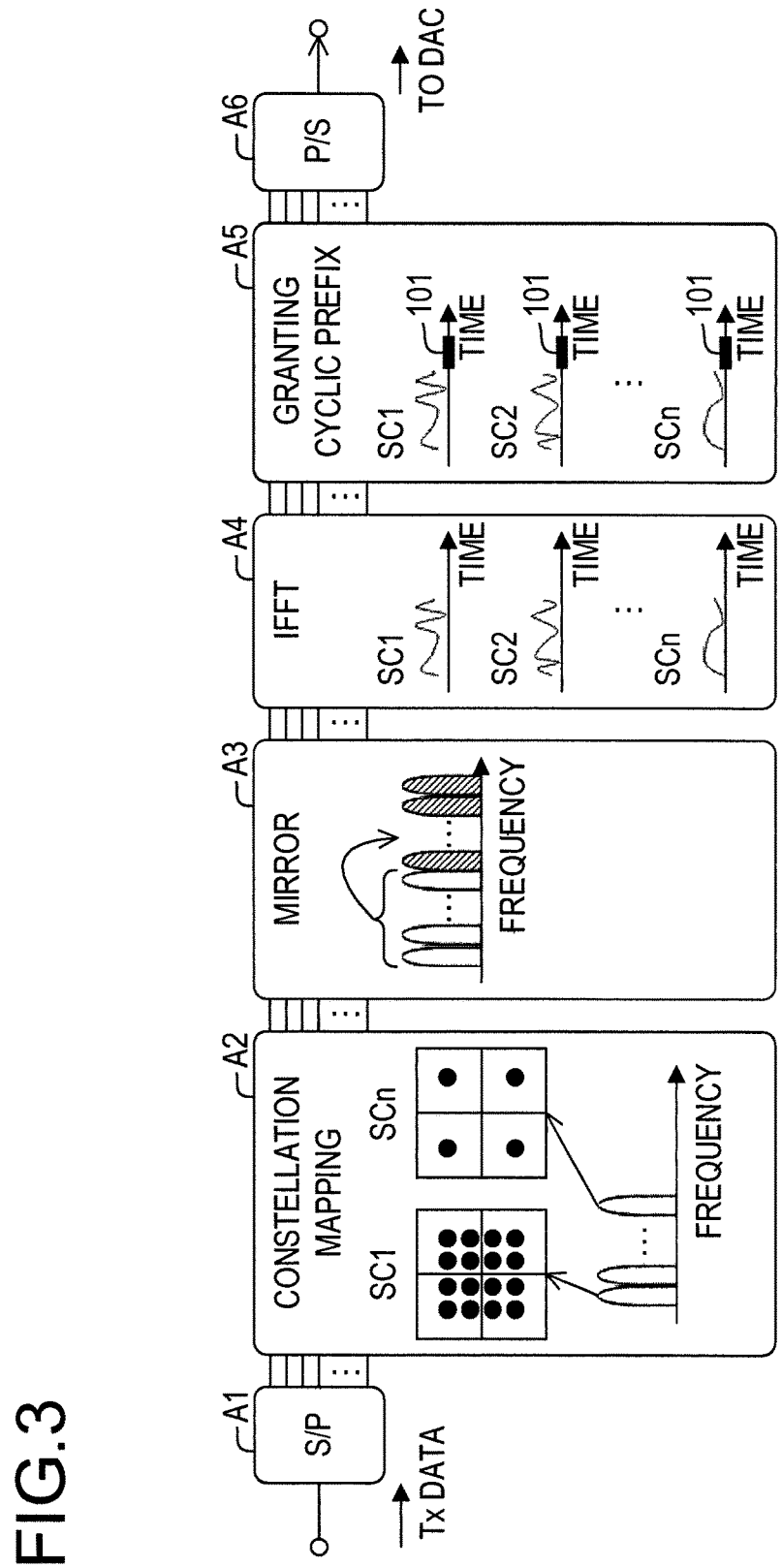

OPTICAL TRANSMITTER, OPTICAL COMMUNICATION SYSTEM, AND OPTICAL TRANSMISSION/RECEPTION CONTROL METHOD

CROSS-REFERENCE TO RELATED APPLICATION

This application is based upon and claims the benefit of priority of the prior Japanese Patent Application No. 2016-145951, filed on Jul. 26, 2016, the entire contents of which are incorporated herein by reference.

FIELD

The embodiments discussed herein are related to an optical transmitter, an optical communication system, and an optical transmission/reception control method.

BACKGROUND

A discrete multi-tone (DMT) modulation transmission method is used in, for example, an access based metal line such as a very high bit rate digital subscriber line (VDSL). In recent years, as the traffic of a network has increased, application of the DMT modulation to an optical transmission technology has been researched and developed.

The DMT modulation is a multi-carrier transmission technology (see, e.g., Patent Documents 1 and 2) based on an orthogonal frequency division multiplexing (OFDM) technology. In the DMT modulation, data are allocated to a plurality of subcarriers (SCs) having different frequencies, respectively, and the allocated data are modulated based on a multi-level degree and signal power depending on a transmission characteristic for each SC to be transmitted as a DMT signal. Herein, examples of the multi-level modulation used for the data of each SC may include quadrature phase shift keying (QPSK) or quadrature amplitude modulation (QAM).

Related technologies are disclosed in, for example, Japanese Laid-Open Patent Publication Nos. 2010-147983, 2003-332853, and 2002-223171.

SUMMARY

According to an aspect of the invention, an optical transmitter includes an optical modulator configured to modulated light having a predetermined wavelength into an optical signal based on a data signal, a memory, and a processor coupled to the memory and the processor configured to modulate an input signal into a multi-carrier signal so as to generate the data signal, the multi-carrier signal including a plurality of subcarriers each to which a transmission capacity is allocated, acquire a first frequency distribution of an intensity of the multi-carrier signal, acquire a second frequency distribution of an intensity of the optical signal, control the modulating of the input signal into the multi-carrier signal to change a number of subcarriers of the multi-carrier signal, and control the optical modulator to adjust a modulation characteristic of the optical modulator so that a divergence between the first frequency distribution and the second frequency distribution is equal to or less than a predetermined value.

The object and advantages of the disclosure will be realized and attained by means of the elements and combinations particularly pointed out in the claims.

It is to be understood that both the foregoing general description and the following detailed description are exemplary and explanatory and are not restirctive of the disclosure, as claimed.

BRIEF DESCRIPTION OF DRAWINGS

FIG. 3 is a diagram for describing DMT modulation processing in a DMT modulation unit included in an optical transmitter of the optical communication system of FIG. 1;

DESCRIPTION OF EMBODIMENTS

Figure 1:
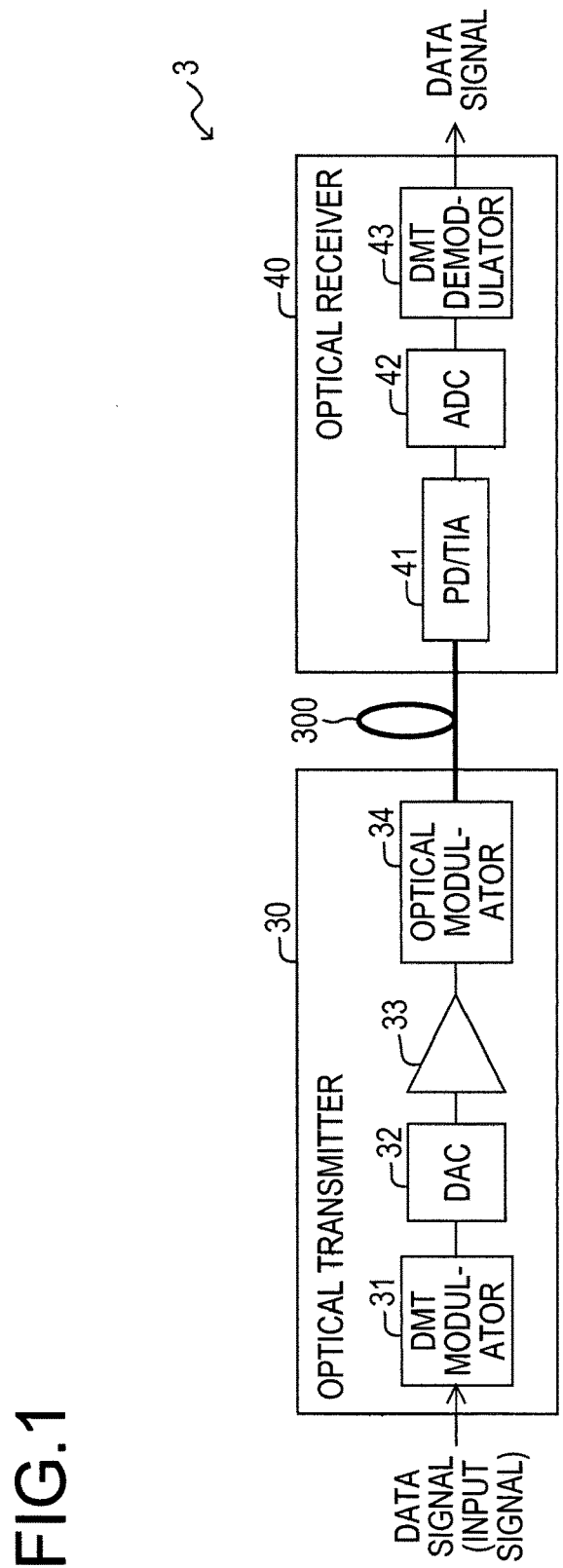
FIG. 1 is a block diagram schematically illustrating a configuration of an optical communication system as a first related art.

A DMT-modulated digital signal is transmitted after being converted into an optical signal by an optical modulator including a Mach-Zehnder type optical modulator, etc. However, since for example, an area showing a non-linear characteristic exists in a modulation characteristic of the optical modulator such as a change characteristic of power of the optical signal for bias voltage, there is a problem that a transmission characteristic of the optical signal deteriorates. Further, the problem is not limited to a DMT modulated optical signal but similarly exists even in other modulated optical signals.

Hereinafter, embodiments of a technology that may enhance the transmission characteristic of the optical signal in an optical transmitter will be described with reference to the accompanying drawings. However, the embodiments disclosed below are just an example and there is no intention that will exclude application of various modified examples or technologies which are not specified in the embodiments. That is, the embodiments may be implemented by modifying the embodiments within a range without departing from the gist of the embodiments.

Each drawing does not intend to include only components illustrated in the drawing, but may include other functions, etc.

Herein, since respective same reference numerals refer to same elements in the drawings, detailed descriptions thereof will be omitted.

FIG. 1 is a block diagram schematically illustrating a configuration of an optical communication system 3 as a first related art.

The optical communication system 3 includes an optical transmitter 30 and an optical receiver 40 that perform a DMT modulation transmission.

The optical transmitter 30 transmits an optical signal to the optical receiver 40 through a transmission path 300 including an optical fiber, etc. The optical transmitter 30 includes a DMT modulator 31, a digital-analog converter (DAC) 32, an amplifier 33, and an optical modulator 34.

The DMT modulator 31 DMT-modulates a data signal input from the outside. The DMT modulator 31 modulates the data signal (an input signal) into a multi-carrier signal including plural subcarriers to which individual transmission capacities are allocated, respectively. In more detail, the DMT modulator 31 allocates a multi-level degree of modulation and signal power to the multiple subcarriers.

Details of the DMT modulation processing by the DMT modulator 31 will be described below using FIGS. 2A, 2B, and 2C, and 3.

The DAC 32 converts the data signal DMT-modulated by the DMT modulator 31 from a digital signal into an analog signal.

The amplifier 33 amplifies the data signal converted into the analog signal. That is, the amplifier 33 amplifies the DMT-modulated data signal. The amplifier 33 may be, for example, an electric amplifier.

The optical modulator 34 optically modulates light having a predetermined wavelength, which is generated by a light source (not illustrated) into optical signal based on the data signal which has been DMT-modulated by the DMT modulator 31. As a result, the DMT-modulated data signal overlaps with the light of the light source. Meanwhile, in this example, a Mach-Zehnder type optical modulator is exemplified as the optical modulator 34, but the optical modulator 34 is not limited thereto. Further, instead of the light source and the optical modulator 34, a directly modulated laser may be used.

The optical signal acquired by the optical modulation by the optical modulator 34 is transmitted to the optical receiver 40 through the transmission path 300.

The optical receiver 40 receives the optical signal transmitted from the optical transmitter 30, and restores the received optical signal to the original data signal and outputs the restored data signal to the outside. The optical receiver 40 includes a photo detector/trans impedance amplifier (PD/TIA) 41, an analog-digital converter (ADC) 42, and a DMT demodulator 43.

The PD/TIA 41 converts the optical signal into the data signal of an electric signal.

The ADC 42 converts the data signal from the analog signal into the digital signal.

The DMT demodulator 43 demodulates the data signal DMT-modulated by the DMT modulator 31 of the optical transmitter 30. Further, details of the DMT demodulation processing by the DMT demodulator 43 will be described below with reference to FIG. 4.

The DMT modulator 31 of the optical transmitter 30 and the DMT demodulator 43 of the optical receiver 40 may be constituted by a device that performs digital signal processing, such as a digital signal processor (DSP).

Figure 2C:
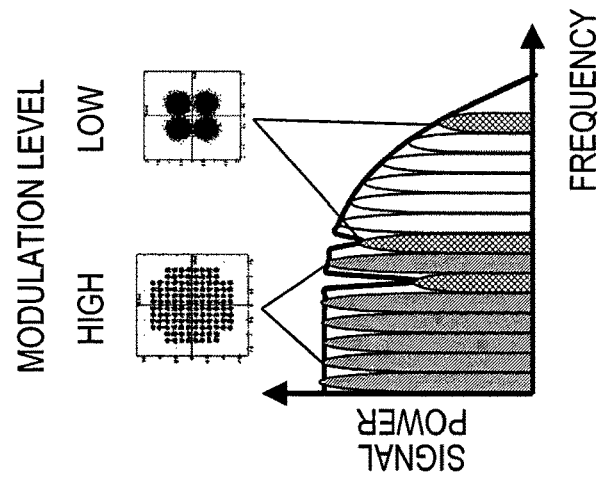
FIGS. 2A, 2B, and 2C are diagrams for describing a DMT technology.
Figure 2B:
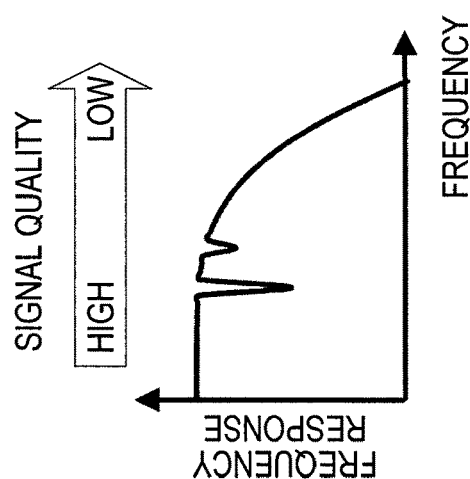
Figure 2A:
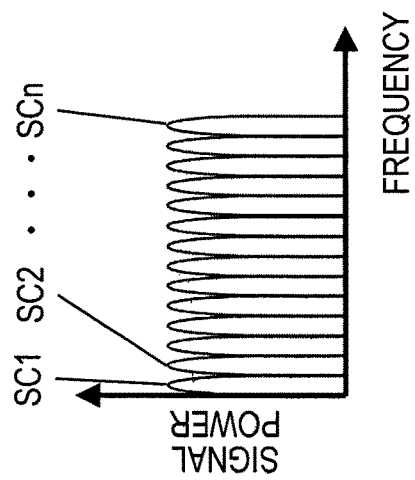

FIGS. 2A, 2B, and 2C are diagrams for describing a DMT technology.

FIG. 2A is a graph illustrating one example of a probe signal. In the graph illustrated in FIG. 2A, the horizontal axis represents a frequency, and the vertical axis represents the signal power.

Before an operating of the optical communication system 3 starts, the probe signal is transmitted from the optical transmitter 30 to the optical receiver 40, and as a result, a transmission characteristic of each of subcarriers SC1, SC2, . . . , SCn (n represents a positive integer) having different frequencies is measured. The probe signal is, for example, a multi-carrier signal including data having a fixed pattern and is constituted by plural subcarriers SC1, SC2, . . . , SCn each having the same multi-level degree and signal power.

FIG. 2B is a graph illustrating one example of the transmission characteristic of the probe signal. In the graph illustrated in FIG. 2B, the horizontal axis represents the frequency, and the vertical axis represents a frequency response.

The transmission characteristic represents a signal quality such as a signal-noise ratio (SNR) or bit error rate (BER). In this example, as the frequency becomes high, the frequency response deteriorates. As a result, it is determined that the signal quality becomes low as the frequency becomes high, and the signal quality becomes high as the frequency becomes low.

FIG. 2C is a graph illustrating one example of allocation of the multi-level degree to the subcarriers SC1, SC2, . . . , SCn. In the graph illustrated in FIG. 2C, the horizontal axis represents the frequency, and the vertical axis represents the signal power.

The multi-level degree and the signal power are allocated to each of the subcarriers SC1, SC2, . . . , SCn, based on the transmission characteristic illustrated in FIG. 2C. The data of each of the subcarriers SC1, SC2, . . . , SCn are modulated by a modulation means depending on the allocated multi-level degree. As the modulation schemes, the QAM or QPSK may be provided. For example, the QPSK is used in the data (e.g., "see a subcarrier with hatching") of a subcarrier having the comparatively low transmission characteristic.

FIG. 3 is a diagram for describing a DMT modulation processing in the DMT modulator 31 included in the optical transmitter 30 of the optical communication system 3 of FIG. 1.

The DMT modulation processing includes respective processing including serial/parallel (S/P) conversion, constellation mapping, mirror processing, IFFT, granting of a cyclic prefix, and parallel/serial (P/S) conversion as represented by reference numerals A1 to A6, respectively. Herein, the IFFT is an abbreviation of inverse fast Fourier transform.

In the S/P conversion processing represented by reference numeral A1, the data signals of serial data are converted into parallel data of n columns to correspond to the subcarriers SC1 to SCn.

In the mapping processing represented by reference numeral A2, mapping for multi-level modulation (may be called "signal point arrangement") is performed for each of the subcarriers SC1 to SCn to correspond to each of the parallel data. As the modulation in this case, the QAM or the QPSK may be provided as described above, but the modulation is not limited thereto.

In the mirror processing represented by reference numeral A3, mirroring is performed so as to achieve a complex conjugate symmetry, and a convolution integration is performed with respect to the subcarriers SC1 to SCn to obtain intensity information.

In the IFFT processing represented by reference numeral A4, frequency domain information of each of the subcarriers SC1 to SCn is converted into time domain information.

In the cyclic prefix granting processing represented by reference numeral A5, a cyclic prefix (CP) 101 is granted to a head of a frame constituting the respective subcarriers SC1 to SCn. The cyclic prefix 101 is a temporal guard interval provided at the head of each frame. The cyclic prefix 101 is granted to suppress a frame interference in which a delay wave of a straight-line frame exerts to a next frame and an inter-subcarrier interference due to a collapse of frequency orthogonality among the subcarriers SC1 to SCn.

In the P/S conversion processing represented by reference numeral A6, the parallel data to which the cyclic prefix 101 is granted is converted into the data signal of the serial data. The data signal of the serial data is output to the DAC 32.

Figure 4:
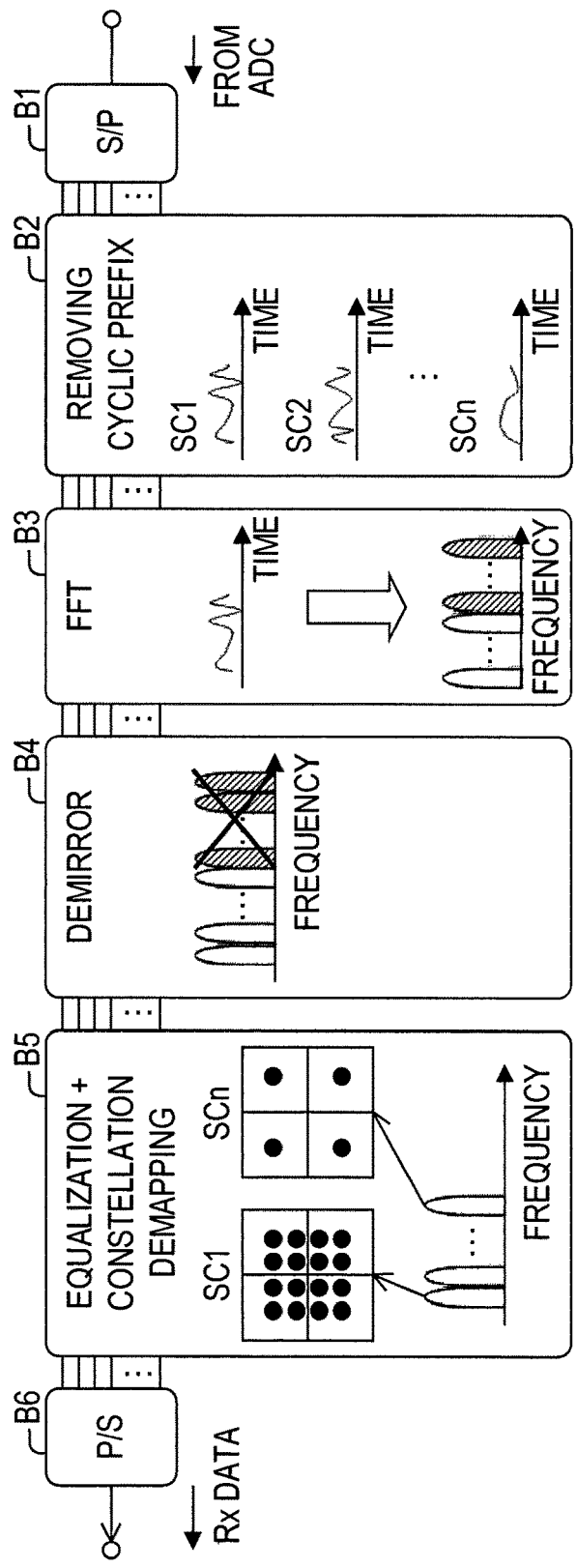
FIG. 4 is a diagram for describing DMT demodulation processing in a DMT modulation unit included in an optical receiver of the optical communication system of FIG. 1.

FIG. 4 is a diagram for describing the DMT demodulation processing in the DMT demodulator 43 included in the optical receiver 40 of the optical communication system 3 of FIG. 1.

The DMT demodulation processing includes each processing of S/P conversion, cyclic prefix removing, FFT, demirror processing, equalization constellation mapping, and P/S conversion as represented by reference numerals B1 to B6. Herein, the FFT is the abbreviation of fast Fourier transform.

In the S/P conversion processing represented by reference numeral B1, the data signals of the serial data input from the ADC 42 are converted into the parallel data of n columns to correspond to the subcarriers SC1 to SCn.

In the cyclic prefix removal processing represented by reference numeral B2, a cyclic prefix 101 (see, e.g., FIG. 3) is removed, which is granted to the frame of each of the subcarriers SC1 to SCn.

In the FFT processing represented by reference numeral B3, the time domain information of each of the subcarriers SC1 to SCn is converted into the frequency domain information by Fourier transform.

In the demirror processing represented by reference numeral B4, a mirror component which is a complex conjugate component is removed.

In the equalization constellation mapping processing represented by reference numeral 65, equalization processing by a digital filter, etc. is performed with respect to each of the subcarriers SC1 to SCn. Additionally, the demapping processing is performed to perform a demodulation for every subcarriers SC1 to SCn.

In the P/S conversion processing represented by reference numeral B6, the data signal of the parallel data which is subjected to the equalization constellation mapping processing is converted into the serial data.

Figure 5:
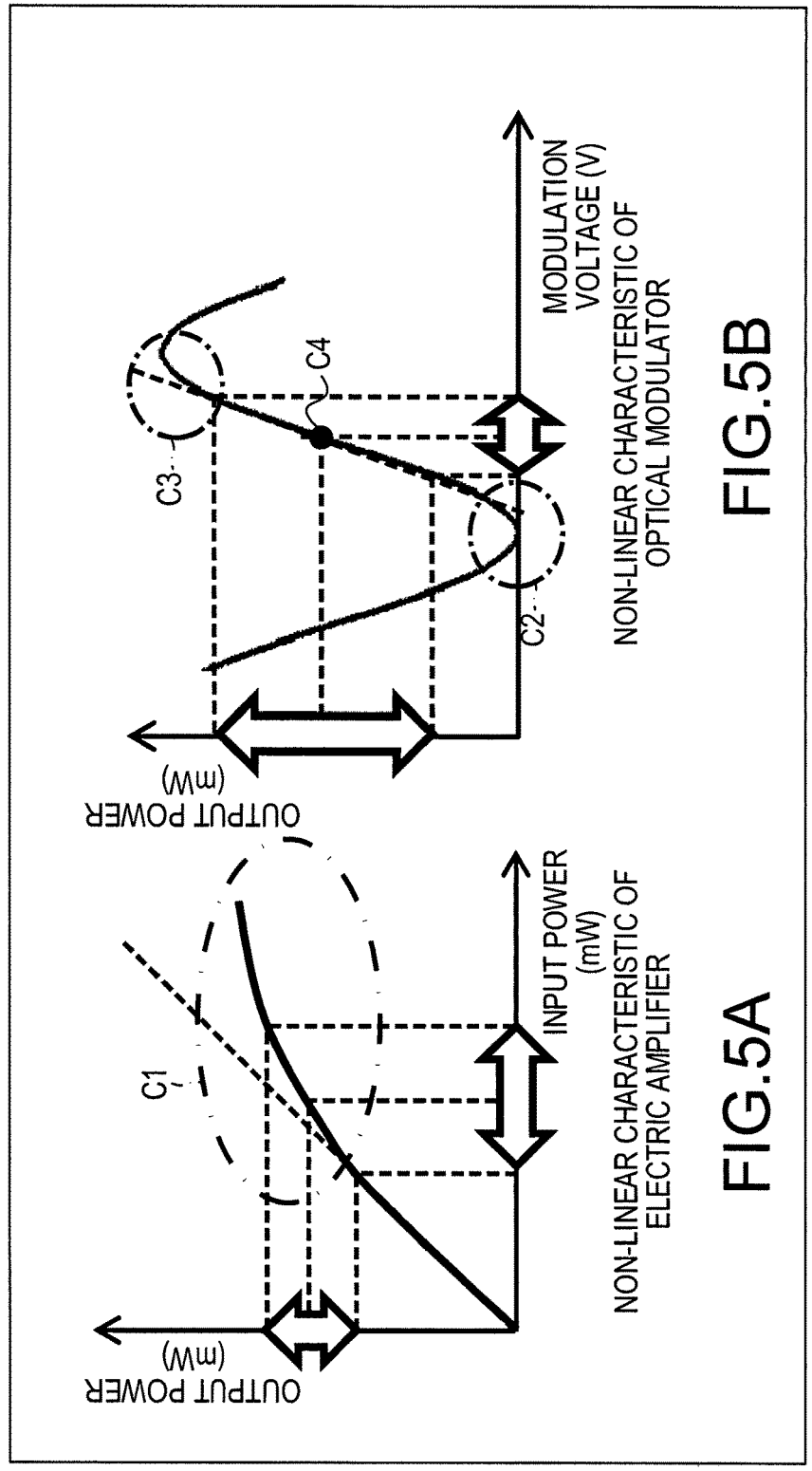
FIGS. 5A and 5B are diagrams for describing non-linear characteristics of an amplifier and an optical modulator in the optical communication system of FIG. 1.

FIGS. 5A and 5B are diagrams for describing non-linear characteristics of the amplifier 33 and the optical modulator 34 in the optical communication system 3 of FIG. 1.

The optical transmitter 30 converts the DMT-modulated data signal into the optical signal by the optical modulator 34 and transmits the optical signal as described above. However, for example, since an area showing the non-linear characteristic exists in the modulation characteristic of the optical modulator 34 as described below, the transmission characteristic of the optical signal may deteriorate. Moreover, even in an amplification characteristic of the amplifier 33, the area showing the non-linear characteristic is included similarly to the optical modulator 34.

FIG. 5A is a graph illustrating the amplification characteristic of the amplifier 33. In the graph illustrated in FIG. 5A, the horizontal axis represents input power (mW) of the data signal, and the vertical axis represents output power (mW) of the data signal.

A change characteristic of the output power to the input power substantially having linearity, but includes an area C1 which partially shows non-linearity. In the non-linear area C1, when the data signal is amplified, the transmission characteristic of the optical signal deteriorates.

FIG. 5B is a graph illustrating the modulation characteristic of the optical modulator 34. In the graph shown in FIG. 56, the horizontal axis represents modulation voltage (may be called "driving voltage") (V) given to a signal electrode on a waveguide in the optical modulator 34, and the vertical axis represents the output power (mW) of the optical signal. Further, reference numeral C4 in the graph represents a bias voltage of the optical modulator 34.

The output power is changed to show a function curve of a square of cosine (COS) with respect to a change in modulation voltage. The driving voltage equivalent to an interval between a maximum value and a minimum value of the function is half-wavelength voltage Vn.

The modulation voltage is applied to the optical modulator 34 so that the optical modulator 34 is driven at bias voltage C4. However, the bias voltage C4 of the optical modulator 34 is drifted due to deterioration or a temperature change as time elapsed. In this case, when the optical modulation is performed in non-linear areas C2 and C3 which exist in the vicinity of the maximum value and the minimum value of the output power, the transmission characteristic of the optical signal deteriorates.

Figure 6:
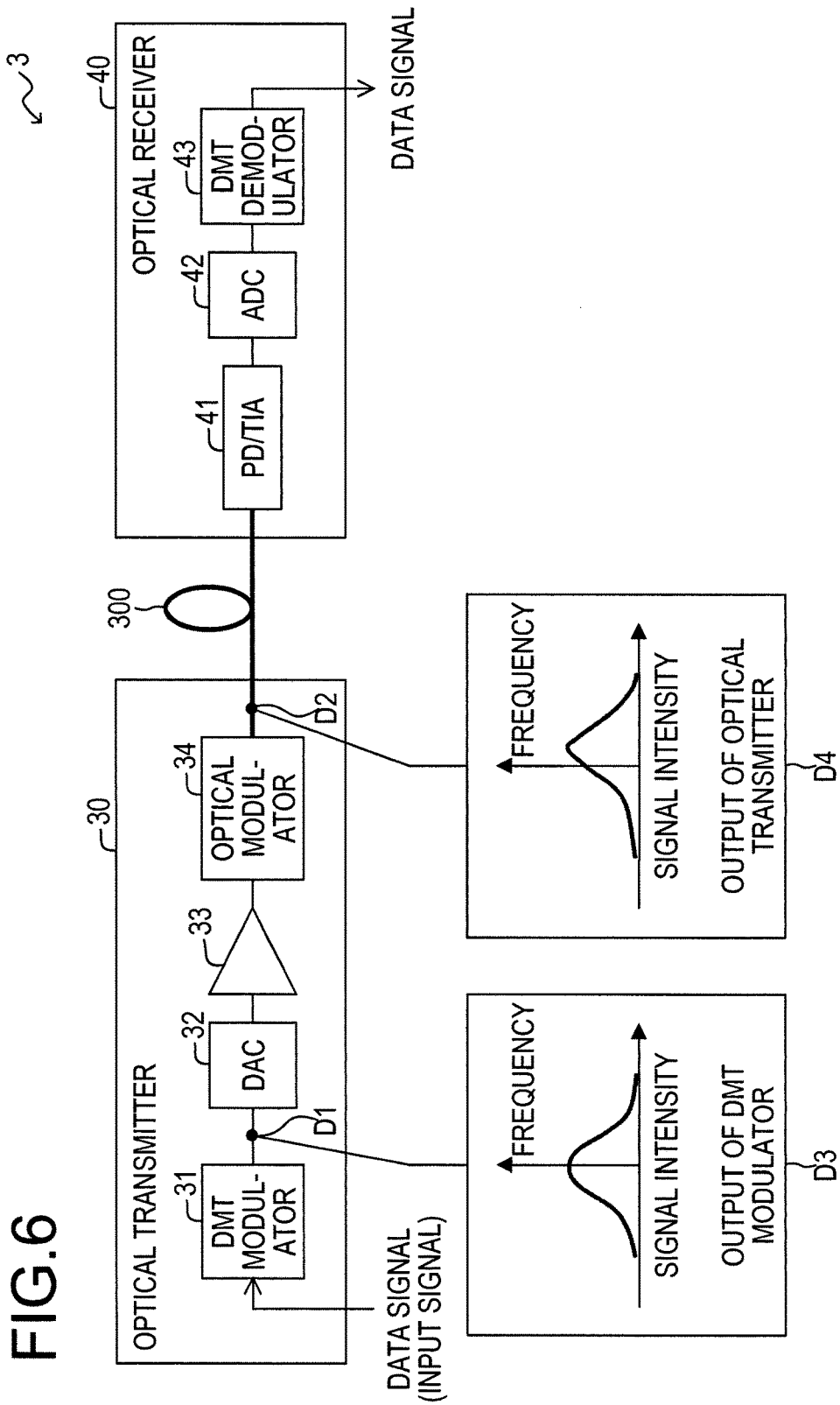
FIG. 6 is a diagram schematically illustrating a frequency distribution of a signal intensity in the optical communication system of FIG. 1.

FIG. 6 is a diagram schematically illustrating a frequency distribution of a signal intensity in the optical communication system 3 of FIG. 1.

The deterioration of the transmission characteristic of the optical signal is represented as a degree of a difference between the frequency distribution of the intensity of the data signal at a point D1 between the DMT modulator 31 and the DAC 32 and the frequency distribution of the intensity of the optical signal at a point D2 at a rear end of the optical modulator 34. Herein, the frequency of the intensity is, for example, the number of frames of the signal for every intensity, which are aggregated within a predetermined time.

The frequency distribution of the intensity of the data signal output from the DMT modulator 31 at the point D1 becomes a normal distribution (see reference numeral D3), while the frequency distribution of the intensity of the optical signal output from the optical modulator 34 at the point D2 is distorted in the normal distribution (see reference numeral D4).

Figure 7:
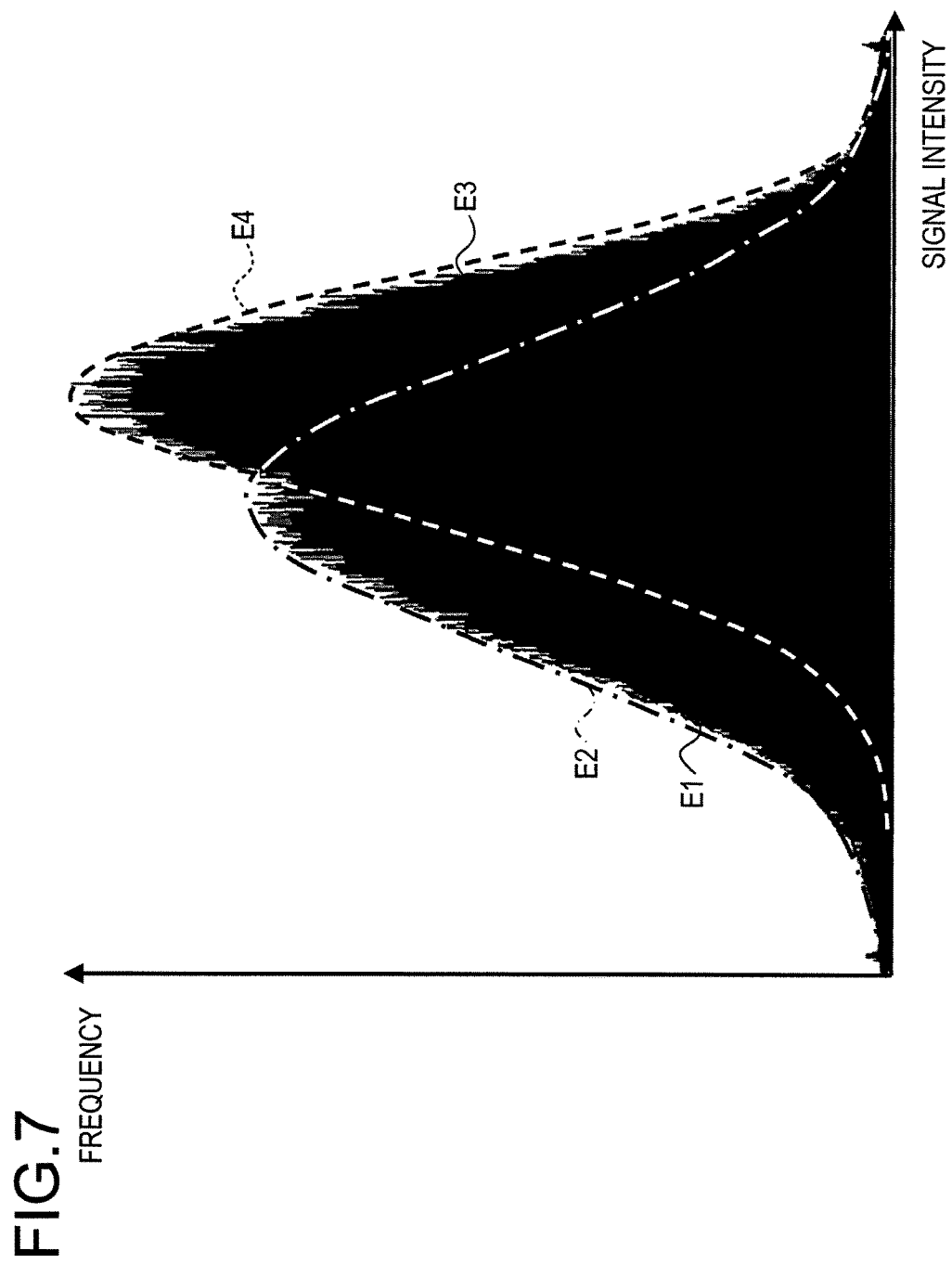
FIG. 7 is a histogram illustrating the frequency distribution of the signal intensity in the optical communication system of FIG. 1.

FIG. 7 is a histogram illustrating the frequency distribution of the signal intensity in the optical communication system 3 of FIG. 1.

In FIG. 7, one example of the frequency distributions of the intensities of the data signal and the optical signal is illustrated. In FIG. 7, the horizontal axis represents the intensity of the data signal or the optical signal, and the vertical axis represents the frequency for every intensity. That is, FIG. 7 illustrates the histogram of the intensity of the data signal or the optical signal.

In the histogram, reference numeral E1 represents the frequency distribution of the intensity of the data signal at the point D1 (see, e.g., FIG. 6), and reference numeral E3 represents the frequency distribution of the intensity of the optical signal at the point D2 (see, e.g., FIG. 6). Further, reference numeral E2 represents the normal distribution, that is, an ideal distribution of the intensity of the data signal or the optical signal. In addition, reference numeral E4 represents an outline of a contour of the frequency distribution of the intensity of the optical signal, which is represented by reference numeral E3.

As understood by comparing the normal distribution E2 and the frequency distribution E1 of the intensity of the data signal, the frequency distribution E1 of the intensity of the data signal shows the ideal distribution. Further, as understood by comparing the normal distribution E2 and the frequency distribution E3 of the intensity of the optical signal, the frequency distribution E3 of the intensity of the optical signal is diverged from the ideal distribution due to an influence of the non-linear areas C1 to C3 (see, e.g., FIGS. 5A and 5B) of the modulation characteristics of the amplifier 33 and the optical modulator 34.

As a result, when a divergence degree of the frequency distributions E1 and E3 is quantitatively calculated by comparing the frequency distribution E1 of the intensity of the data signal and the frequency distribution E3 of the intensity of the optical signal with each other, the divergence degree may be detected as the deterioration of the quality of the optical signal, that is, the transmission characteristic of the optical signal. Hereinafter, the divergence degree of the frequency distribution may be called "divergence degree."

Figure 8:
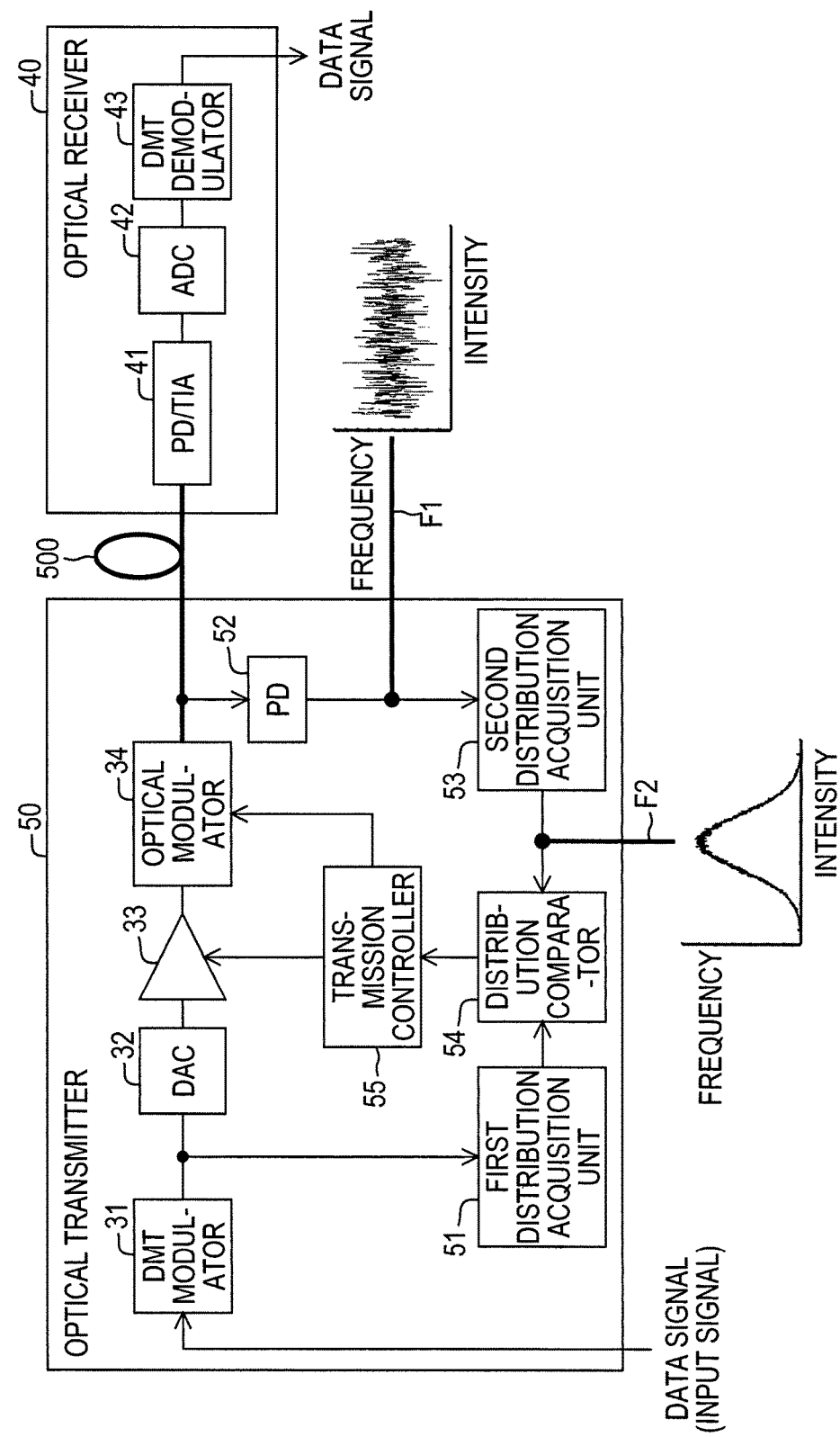
FIG. 8 is a block diagram schematically illustrating the configuration of an optical communication system as a second related art.

FIG. 8 is a block diagram schematically illustrating the configuration of an optical communication system 5 as a second related art. In FIG. 8, the same reference numeral refers to components common to FIG. 1, and a description thereof will be omitted.

The optical communication system 5 includes an optical transmitter 50 and an optical receiver 40 that perform the DMT modulation transmission.

The optical transmitter 50 transmits the optical signal to the optical receiver 40 through a transmission path 500 including the optical fiber, etc. The optical transmitter 50 includes the DMT modulator 31, the DAC 32, the amplifier 33, the optical modulator 34, a first distribution acquisition unit 51, a PD 52, a second distribution acquisition unit 53, a distribution comparator 54, and a transmission controller 55.

The first distribution acquisition unit 51 acquires the frequency distribution of the intensity of the data signal which has been DMT-modulated by the DMT modulator 31. The first distribution acquisition unit 51, for example, periodically detects the intensity of the data signal by the unit of the frame and aggregates the number of frames for every range of a predetermined intensity at a predetermined interval to measure the frequency distribution. The first distribution acquisition unit 51 outputs distribution information representing the measured frequency distribution to the distribution comparator 54.

The optical signal output from the optical modulator 34 is split by a splitter (not illustrated) to be induced to the transmission path 500 and the PD 52.

The PD 52 electrically detects the intensity of the input optical signal and outputs the detected intensity to the second distribution acquisition unit 53 as represented by reference numeral F1.

The second distribution acquisition unit 53 acquires the frequency distribution of the intensity of the optical signal, which is obtained by the optical modulation of the optical modulator 34 as represented by reference numeral F2. The second distribution acquisition unit 53, for example, periodically detects the intensity of the optical signal by the unit of the frame and aggregates the number of frames for every range of the predetermined intensity at the predetermined interval to measure the frequency distribution, based on the input signal from the PD 52. The second distribution acquisition unit 53 outputs the distribution information representing the measured frequency distribution to the distribution comparator 54.

The distribution comparator 54 compares the frequency distributions acquired by the first and second distribution acquisition units 51 and 53, respectively. In more detail, the distribution comparator 54, for example, calculates the divergence degree among the respective frequency distributions.

The distribution comparator 54, for example, calculates the distortion degree and a kurtosis of each frequency distribution and calculates the divergence degree from the distortion degree and the kurtosis. Herein, the distortion degree represents an asymmetric degree of the frequency distribution of the intensity around an average value of the intensity, and the kurtosis represents a sharpness degree of a peak of the frequency distribution of the intensity. The distribution comparator 54 outputs the calculated divergence degree to the transmission controller 55.

The transmission controller 55 controls transmission characteristic of the optical transmitter 50. The transmission controller 55 controls the modulation characteristic of the optical modulator 34 based on the divergence degree. The transmission controller 55 may, for example, control the modulation characteristic by adjusting the bias voltage C4 (see, e.g., FIG. 5B) as described above. Further, the transmission controller 55 may adjust a modulation amplitude (an amplitude of the function curve illustrated in FIG. 5A) in addition to the bias voltage C4.

As described above, the transmission controller 55 controls the modulation characteristic of the optical modulator 34 according to a comparison result by the distribution comparator 54. Further, since the optical signal is optically modulated based on the data signal modulated to the multi-carrier signal including the plural subcarriers SC1 to SCn, the deterioration of the transmission characteristic of the optical signal is represented as the degree of the difference between the frequency distributions of the intensities of the data signal and the optical signal.

Therefore, the transmission controller 55 may optimally control the modulation characteristic of the optical modulator 34 as the transmission characteristic of the optical signal deteriorates. As a result, the transmission controller 55 may enhance the transmission characteristic by reducing the influence of the non-linear areas C2 and C3 (see, e.g., FIGS. 5A and 5B) in the modulation characteristic of the optical modulator 34.

Further, the transmission controller 55 may control the amplification characteristic of the amplifier 33 according to the comparison result by the distribution comparator 54. In this case, the transmission controller 55, for example, controls a gain of the amplifier 33 based on the divergence degree.

The transmission controller 55 may optimally control the amplification characteristic of the amplifier 33 with the deterioration of the transmission characteristic of the optical signal, which is represented as the degree of the difference between the frequency distributions of the intensities of the data signal and the optical signal. As a result, the transmission characteristic may be further enhanced by reducing the influence of the non-linear area C1 in the amplification characteristic of the amplifier 33.

Figure 9:
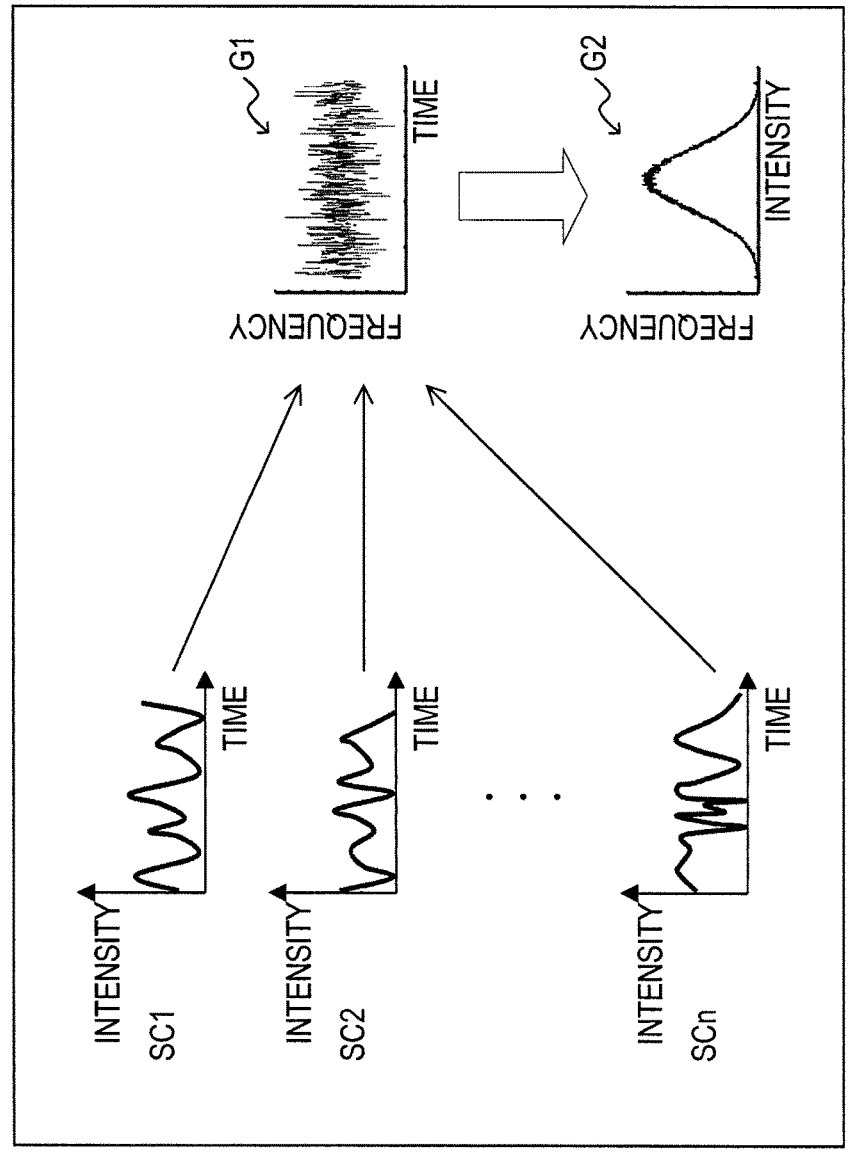
FIG. 9 is a diagram for describing overlapping processing of subcarriers.
Figure 10:
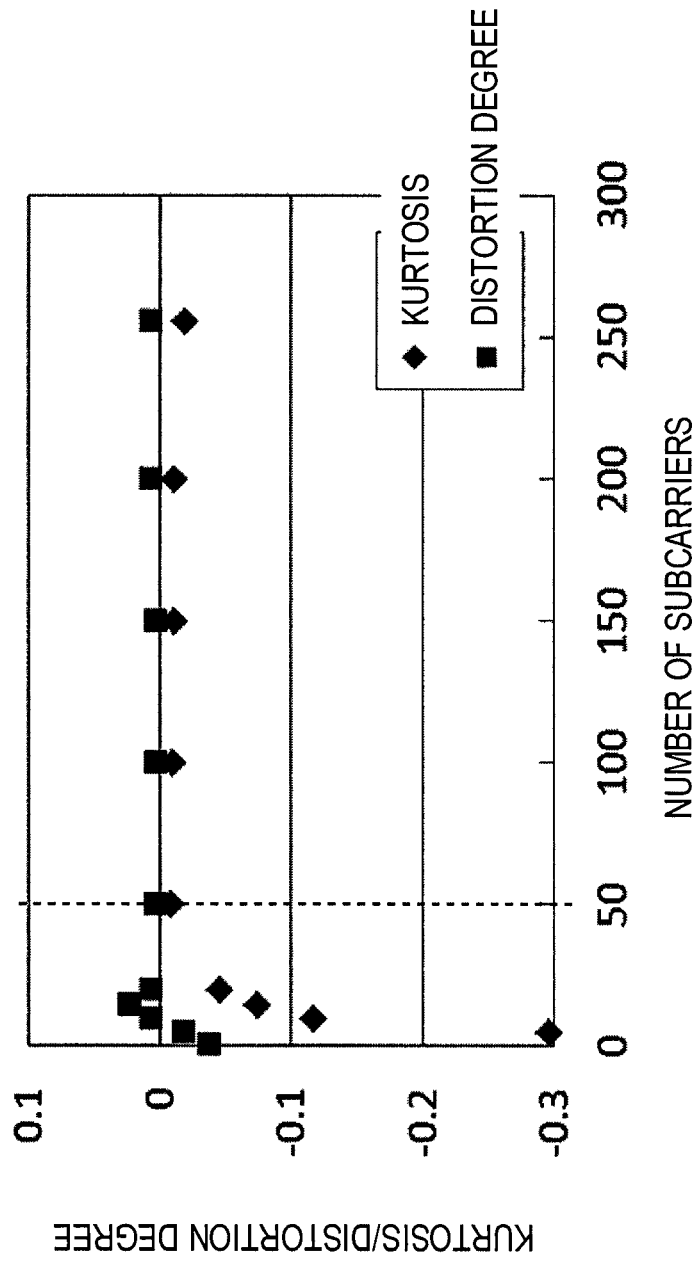
FIG. 10 is a graph illustrating an exemplary relationship between the number of subcarriers and a kurtosis and an exemplary relationship between the number of subcarriers and a distortion degree.

FIG. 9 is a diagram for describing an overlapping processing of subcarriers. FIG. 10 is a graph illustrating an exemplary relationship between the number of subcarriers and a kurtosis and an exemplary relationship between the number of subcarriers and a distortion degree.

As illustrated in FIG. 9, when multiple subcarriers having different frequencies overlap with each other (see reference numeral G1), the frequency distribution of the signal intensity is close to the normal distribution (see reference numeral G2).

When a predetermined number or more of subcarriers are received by the PD 52 illustrated in FIG. 8, the frequency distribution of the signal intensity becomes the normal distribution even though the subcarriers in all bands are not received.

In the graph illustrated in FIG. 10, a kurtosis $\alpha_4$ is defined by $$\alpha_4 = \frac{E(X-\mu)^4}{\sigma^4} \qquad \text{[Equation 1]}$$

and a distortion degree $\alpha_3$ is defined by $$\alpha_3 = \frac{E(X-\mu)^3}{\sigma^3} \qquad \text{[Equation 2]}$$

where, $E(X)$ represents an expectation value, $\mu$ represents an average value, and $\sigma$ represents a standard deviation.

As illustrated in FIG. 10, when 50 subcarriers or more are received by the PD 52, the kurtosis and the distortion degree are proximate to 0, and the frequency distribution of the signal intensity becomes the normal distribution. In order to make the kurtosis and the distortion degree to be 0, when sampling rate is 64 GS/s and the total number of subcarriers is 256, the subcarrier in 6 GHz band is sampled.

As described above, in the optical communication system 5 in the second related art, a transmission band of the PD 52 used for making the frequency distribution of the signal intensity be the normal distribution is widened, and as a result, the configuration of the optical communication system 5 becomes high-priced.

Figure 11:
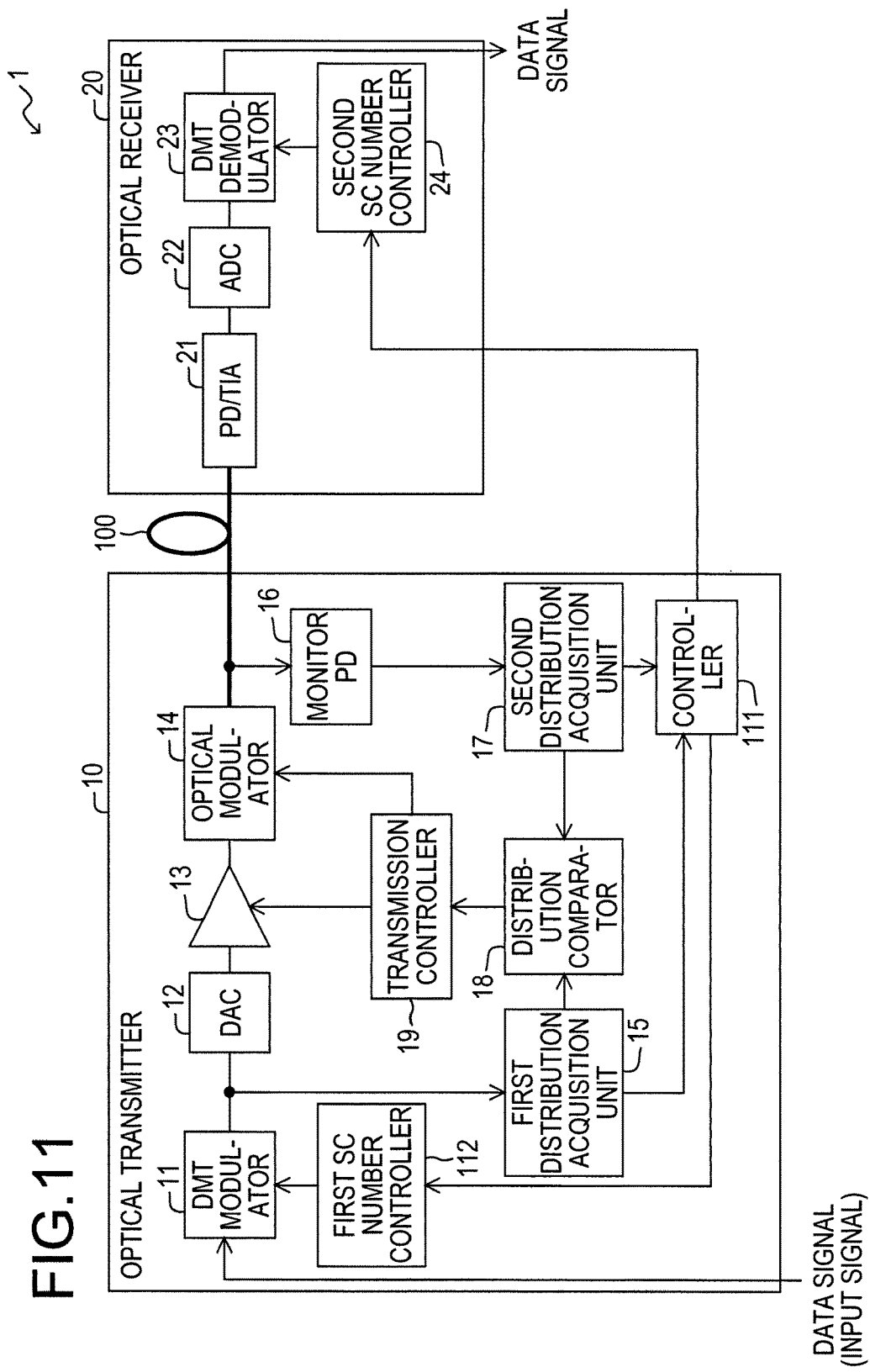
FIG. 11 is a block diagram schematically illustrating the configuration of an optical communication system as an example of an embodiment.

FIG. 11 is a block diagram schematically illustrating the configuration of an optical communication system 1 as an example of an embodiment.

The optical communication system 1 includes an optical transmitter 10 and an optical receiver 20 that perform the DMT modulation mode transmission.

The optical transmitter 10 transmits an optical signal to the optical receiver 20 through a transmission path 100 including an optical fiber, etc. The optical transmitter 10 includes a DMT modulator 11, a DAC 12, an amplifier 13, an optical modulator 14, a first distribution acquisition unit 15, a monitor PD 16, a second distribution acquisition unit 17, a distribution comparator 18, a transmission controller 19, a controller 111, and a first subcarrier number controller 112 as illustrated in FIG. 11.

The DMT modulator 11, the first distribution acquisition unit 15, the second distribution acquisition unit 17, the distribution comparator 18, the transmission controller 19, the controller 111, and the first subcarrier number controller 112 may be configured by a processor including, for example, a DSP. Further, the DAC 12, the amplifier 13, the optical modulator 14, and the monitor PD 16 may be configured by, for example, an analog circuit.

The DMT modulator 11, which is one example of a first modulator, DMT-modulates a data signal input from the outside. The DMT modulator 11 modulates the data signal into a multi-carrier signal including plural subcarriers to which individual transmission capacities are allocated, respectively. In more detail, the DMT modulator 11 allocates a multi-level degree of modulation and signal power to the multiple subcarriers.

The DMT modulator 11 may perform the DMT modulation processing with reference to FIGS. 2A to 2C and FIG. 3.

The DAC 12 converts the data signal which has been DMT-modulated by the DMT modulator 11 from a digital signal into an analog signal.

The amplifier 13 amplifies the data signal converted into the analog signal. That is, the amplifier 13 amplifies the DMT-modulated data signal. The amplifier 13 may be, for example, an electric amplifier.

The optical modulator 14, which is one example of a second modulator, optically modulates light having a predetermined wavelength, which is generated by a light source (not illustrated) into an optical signal based on the data signal DMT-modulated by the DMT modulator 11. As a result, the DMT-modulated data signal overlaps with the light of the light source. Meanwhile, in this example, a Mach-Zehnder type optical modulator is exemplified as the optical modulator 14, but the optical modulator 14 is not limited thereto. Further, instead of the light source and the optical modulator 14, a direct modulation laser may be used.

The optical signal acquired by the optical modulation by the optical modulator 14 is transmitted to the optical receiver 20 through the transmission path 100.

The first distribution acquisition unit 15, which is one example of a first acquisition unit, acquires the frequency distribution of the intensity of the data signal DMT-modulated by the DMT modulator 11. The first distribution acquisition unit 15, for example, periodically detects the intensity of the data signal in the unit of the frame and aggregates the number of frames for every range of a predetermined intensity at a predetermined interval to measure the frequency distribution. The first distribution acquisition unit 15 outputs distribution information representing the measured frequency distribution to the distribution comparator 18.

The optical signal output from the optical modulator 14 is split by a splitter (not illustrated) to be induced to the transmission path 100 and the monitor PD 16.

The monitor PD 16 electrically detects the intensity of the input optical signal and outputs the intensity to the second distribution acquisition unit 17.

The second distribution acquisition unit 17, which is one example of a second acquisition unit, acquires the frequency distribution of the intensity of the optical signal obtained by the optical modulation of the optical modulator 14. The second distribution acquisition unit 17, for example, periodically detects the intensity of the optical signal by the unit of the frame and aggregates the number of frames for every range of the predetermined intensity at the predetermined interval to measure the frequency distribution, based on the input signal from the monitor PD 16. The second distribution acquisition unit 17 outputs the distribution information representing the measured frequency distribution to the distribution comparator 18.

The distribution comparator 18, which is one example of a comparator, compares the frequency distributions acquired by the first and second distribution acquisition units 15 and 17, respectively. In more detail, the distribution comparator 18, for example, calculates the divergence degree among the respective frequency distributions.

The distribution comparator 18, for example, calculates the distortion degree and the kurtosis of each frequency distribution and calculates the divergence degree from the distortion degree and the kurtosis. Herein, the distortion degree represents an asymmetric degree of the frequency distribution of the signal intensity around an average value of the signal intensity, and the kurtosis represents a sharpness degree of a peak of the frequency distribution of the signal intensity. The distribution comparator 18 outputs the calculated divergence degree to the transmission controller 19.

The transmission controller 19 controls the transmission characteristic of the optical transmitter 10. The transmission controller 19 controls the modulation characteristic of the optical modulator 14 based on the calculated divergence degree. The transmission controller 19 may, for example, control the modulation characteristic by adjusting the bias voltage C4 (see, e.g., FIG. 5B) as described above. Further, the transmission controller 19 may adjust the modulation amplitude (the amplitude of the function curve illustrated in FIG. 5A) in addition to the bias voltage C4.

In other words, the transmission controller 19 controls the modulation characteristic by the optical modulator 14 so that a divergence between a first frequency distribution acquired by the first distribution acquisition unit 15 and a second frequency distribution acquired by the second distribution acquisition unit 17 is equal to or less than a predetermined value.

As described above, the modulation characteristic by the optical modulator 14 is controlled such that the divergence between the first frequency distribution and the second frequency distribution is equal to or less than the predetermined value to enhance the transmission characteristic.

The transmission controller 19 controls the modulation characteristic by the optical modulator 14 so that the second frequency distribution acquired by the second distribution acquisition unit 17 becomes the normal distribution.

As described above, the modulation characteristic by the optical modulator 14 is controlled such that the second frequency distribution becomes the normal distribution to certainly enhance the transmission characteristic in the optical transmitter 10.

In other words, the transmission controller 19 controls the modulation characteristic by the optical modulator 14 so that the kurtosis and the distortion degree of the frequency distribution of the signal intensity, which is acquired by the second distribution acquisition unit 17 become 0.

The controller 111 controls a start and an end of a control of the optical transmitter 10. The controller 111 determines the number of subcarriers, which is set in the DMT modulator 11. The controller 111 may determine the number of subcarriers of the multi-carrier signal output from the DMT modulator 11 to be set to, for example, 50 as described above by using FIG. 10.

In other words, the controller 111 changes and controls the number of subcarriers of the multi-carrier signal in the DMT modulator 11.

Figure 12:
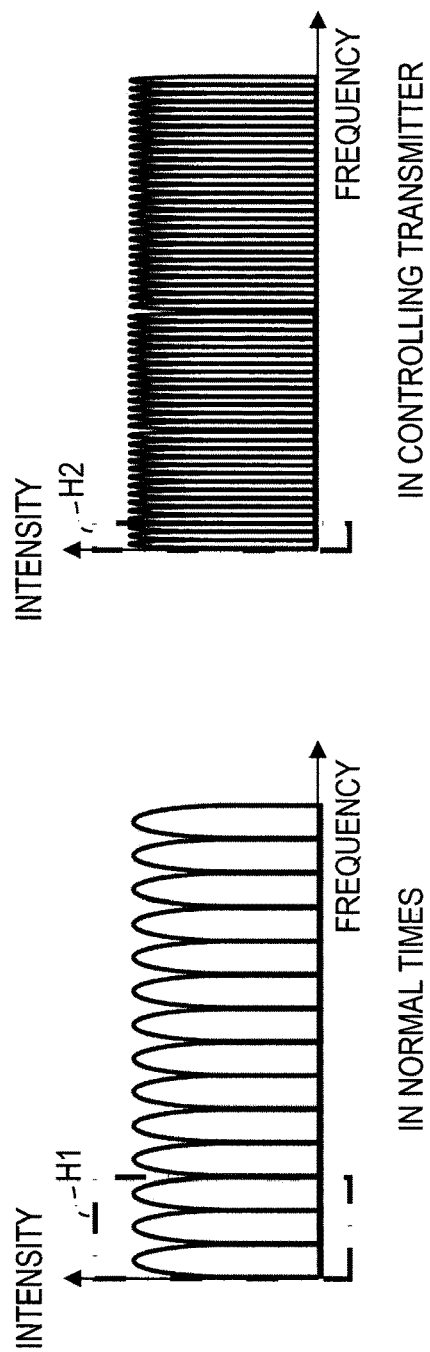
FIGS. 12A and 12B are diagrams schematically illustrating a density change of subcarriers in the optical communication system of FIG. 11.

FIGS. 12A and 12B are diagrams schematically illustrating a density change of subcarriers in the optical communication system 1 of FIG. 11.

The controller 111 increases the total number of carriers of the multi-carrier signal output from the DMT modulator 11 when controlling the amplifier 13 and the optical modulator 14 by the transmission controller 19. The controller 111, for example, increases the total number of carriers of the multi-carrier signal from 256 in normal times to 2048. In this case, the normal times represent a time when the control by the transmission controller 19 is not performed.

When the total number of carriers increases to 2048, a band which the monitor PD 16 uses for transmitting, for example, 50 subcarriers becomes approximately 800 MHz. In addition, the transmission band in the monitor PD 16 may be narrowed from 6 GHz which is a transmission band of the PD 52 for compensating the normal distribution to 800 MHz in the second related art.

As a result, a frequency band represented by reference numeral H1 of FIG. 12A and the frequency band represented by reference numeral H2 of FIG. 12B include the same number of subcarriers, but have different bandwidths. That is, the frequency band represented by reference numeral H2 of FIG. 12B is narrower than the frequency band represented by reference numeral H1 of FIG. 12A, and as a result, the optical transmitter 10 may include, for example, an 800-MHz narrowband monitor PD 16. The monitor PD 16 is inexpensive when the bandwidth is small, and as a result, the optical communication system 1 as one example of the embodiment becomes an inexpensive component.

The controller 111 notifies the determined number of subcarriers to the first subcarrier number controller 112 and a second subcarrier number controller 24 (to be described below) included in the optical receiver 20.

As described above, the number of subcarriers is notified to the second subcarrier number controller 24, and as a result, the optical receiver 20 may demodulate the multi-carrier signal received from the optical transmitter 10.

The first subcarrier number controller 112 sets the DMT modulator 11 to output the multi-carrier signal of the subcarrier number notified from the controller 111.

The optical receiver 20 receives the optical signal transmitted from the optical transmitter 10, and restores the received optical signal to the original data signal and outputs the restored data signal to the outside. The optical receiver 20 includes a PD/TIA 21, an ADC 22, a DMT demodulator 23, and the second subcarrier number controller 24 as illustrated in FIG. 11.

The DMT demodulator 23 and the second subcarrier number controller 24 may be configured by the processor including, for example, the DSP. Further, the PD/TIA 21 and the ADC 22 may be configured by, for example, the analog circuit.

The PD/TIA 21 converts the optical signal into the data signal of the electric signal.

The ADC 22 converts the data signal from the analog signal into the digital signal.

The DMT demodulator 23, which is one example of the demodulator, demodulates the data signal DMT-modulated by the DMT modulator 11 of the optical transmitter 10. The DMT demodulator 23 may perform the DMT modulation processing by using FIG. 4.

The DMT modulator 11 of the optical transmitter 10 and the DMT demodulator 23 of the optical receiver 20 may be constituted by a device that performs digital signal processing, such as a digital signal processor (DSP).

The second subcarrier number controller 24, which is one example of the subcarrier number controller, sets the DMT demodulator 23 to demodulate the multi-carrier signal of the subcarrier number notified from the controller 111 of the optical transmitter 10.

In other words, the second subcarrier number controller 24 controls the DMT demodulator 23 based on the number of subcarriers notified from the optical transmitter 10.

As described above, the DMT demodulator 23 is controlled based on the number of subcarriers notified from the optical transmitter 10, and as a result, the optical receiver 20 may receive the data signal from the optical transmitter 10 even when the number of subcarriers of the output signal of the DMT modulator 11 is controlled.

Figure 13:
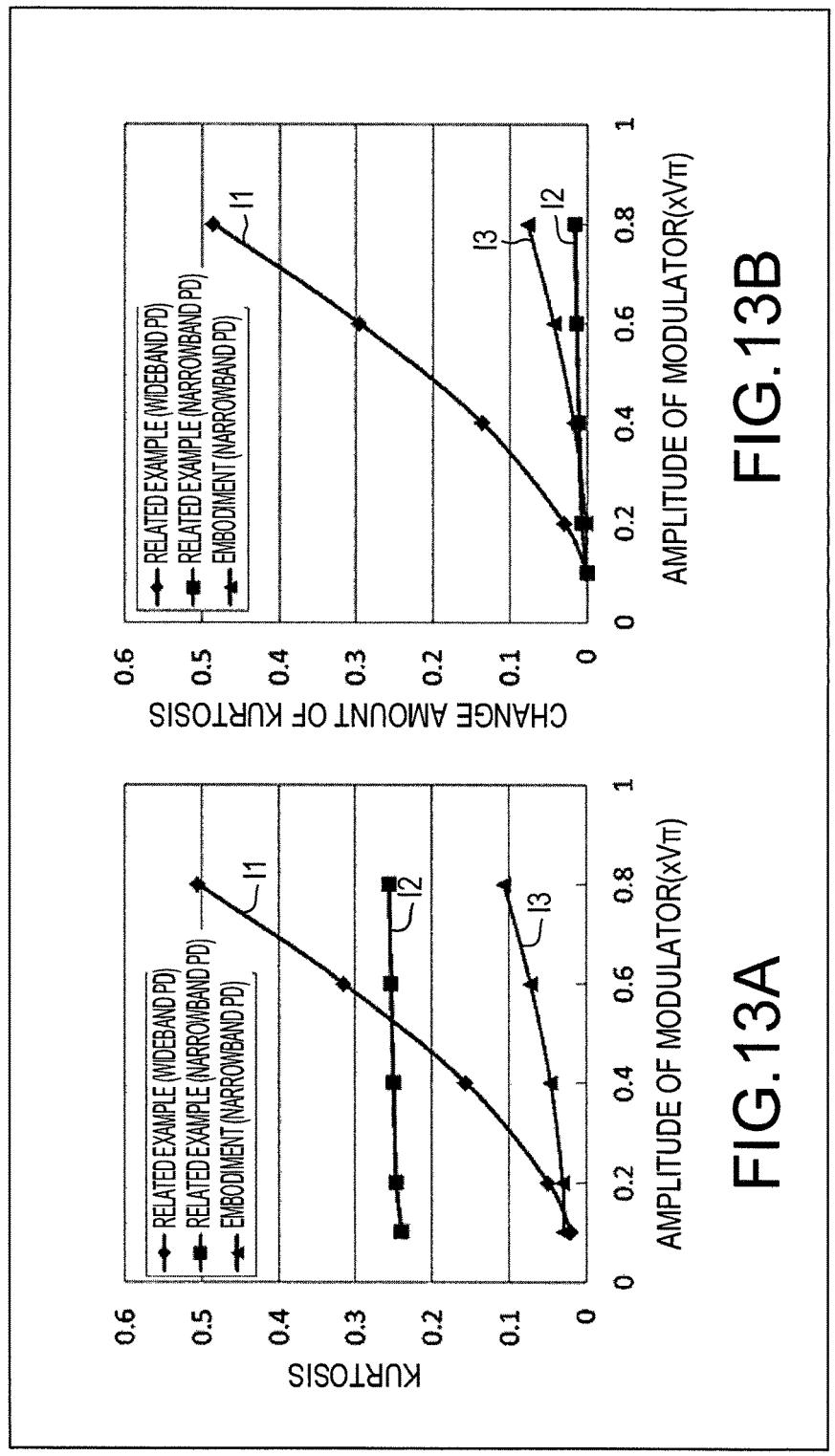
FIGS. 13A and 13B are graphs illustrating an exemplary relationship between a modulator amplitude and a kurtosis and an exemplary relationship between the modulator amplitude and a kurtosis change amount in the optical communication system of FIG. 11.

FIGS. 13A and 13B are graphs illustrating an exemplary relationship between a modulator amplitude and a kurtosis and an exemplary relationship between the modulator amplitude and a kurtosis change amount in the optical communication system 1 of FIG. 11.

In the graph illustrated in FIG. 13A, the horizontal axis represents a modulator amplitude (xVπ), and the vertical axis represents the kurtosis. In the graph illustrated in FIG. 13B, the horizontal axis represents the modulator amplitude, and the vertical axis represents the change amount of the kurtosis.

In FIGS. 13A and 13B, a monitor result is illustrated when a driving amplitude of the Mach-Zehnder type optical modulator 34 or 14 (see, e.g., FIG. 8 or 11) is changed. When the driving amplitude increases, the non-linear characteristic generated by a Mach-Zehnder modulation characteristic is monitored by the kurtosis of the frequency distribution of the intensity.

In the case where the optical communication system 5 in the second related art, which is illustrated in FIG. 8 includes the wideband PD 52, when the modulator amplitude is changed from 0.1 to 0.8 as represented by reference numeral I1 of FIGS. 13A and 13B, the kurtosis increases by approximately 0.5.

In the case where the optical communication system 5 in the second related art, which is illustrated in FIG. 8, includes the narrowband PD 52, when the modulator amplitude is changed from 0.1 to 0.8 as represented by reference numeral I2 of FIGS. 13A and 13B, the kurtosis increases by approximately 0.01.

Meanwhile, in the case where the optical communication system 1 of the embodiment, which is illustrated in FIG. 11, includes the narrowband monitor PD 16, when the modulator amplitude is changed from 0.1 to 0.8 as represented by reference numeral I3 of FIGS. 13A and 13B, the kurtosis increases by approximately 0.08.

As described above, according to the optical communication system 1 of the embodiment, monitor sensitivity by the monitor PD 16 is 8 times as compared with the case where the optical communication system 5 in the second related art includes the narrowband PD 52 similarly.

Figure 14:
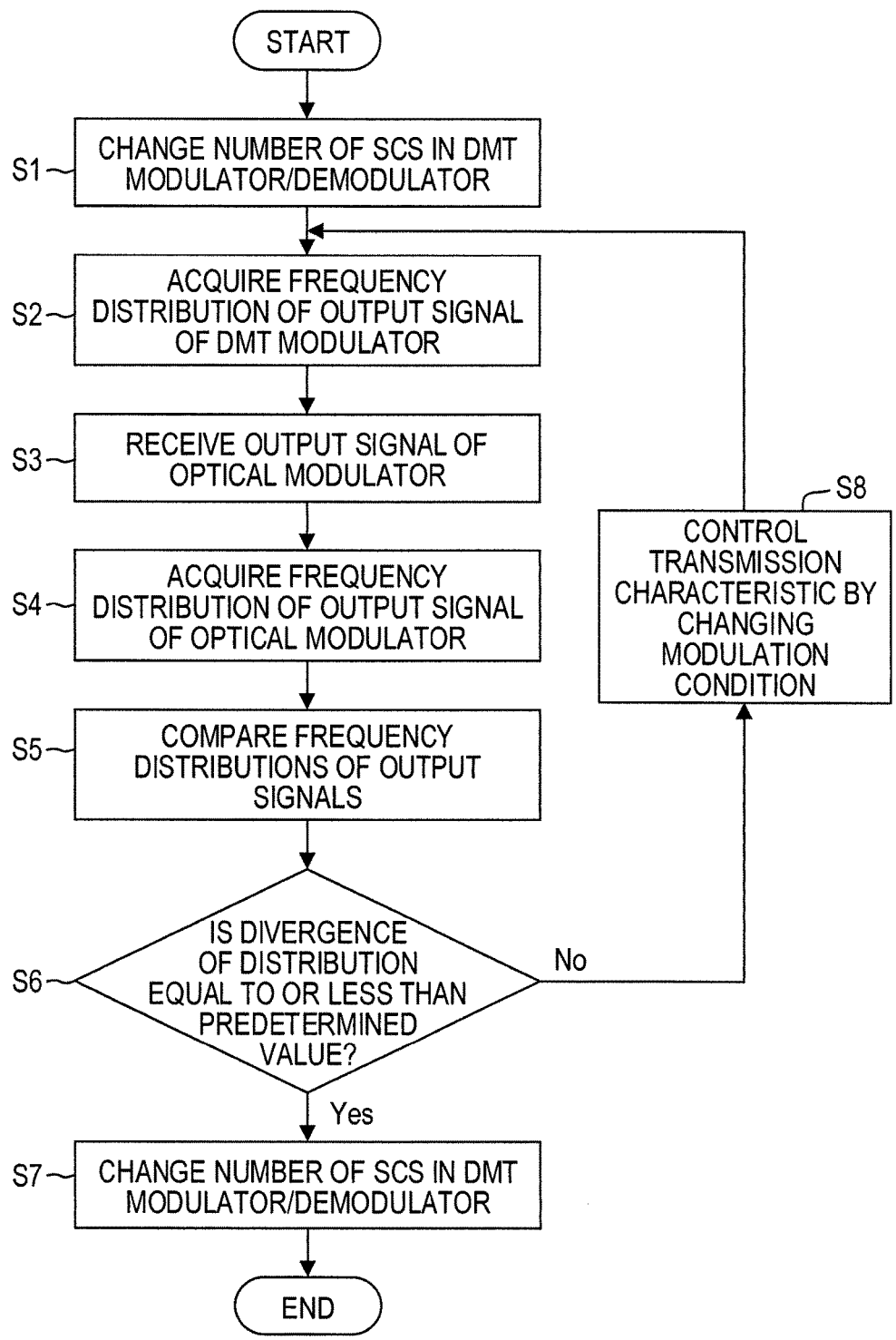
FIG. 14 is a flowchart for describing an optical transmission control operation in an optical transmitter included in the optical communication system of FIG. 11.

An optical transmission control operation in the optical transmitter 10 included in the optical communication system 1 of FIG. 11 will be described according to a flowchart (operations S1 to S8) illustrated in FIG. 14.

The controller 111 changes the number of subcarriers of the output signal in the DMT modulator 11 through the first subcarrier number controller 112. Further, the controller 111 changes the number (SC number) of subcarrier used for demodulation in the DMT demodulator 23 of the optical receiver 20 through the second subcarrier number controller 24 of the optical receiver 20 (operation S1).

The first distribution acquisition unit 15 acquires the frequency distribution of the output signal of the DMT modulator 11 (operation S2).

The monitor PD 16 receives the output signal of the optical modulator 14 (operation S3).

The second distribution acquisition unit 17 acquires the frequency distribution of the output signal of the optical modulator 14 (operation S4).

The distribution comparator 18 compares the frequency distribution of the output signal of the DMT modulator 11 and the frequency distribution of the output signal of the optical modulator 14 (operation S5).

The distribution comparator 18 determines whether the divergence of the frequency distribution is equal to or less than a predetermined value by using a comparison result (operation S6).

The controller 111 changes the number of subcarriers of the output signal in the DMT modulator 11 through the first subcarrier number controller 112 when it is determined that the divergence of the frequency distribution is equal to or less than the predetermined value (see a route of "Yes" of operation S6). Further, the controller 111 changes the number of subcarrier used for demodulation in the DMT demodulator 23 of the optical receiver 20 through the second subcarrier number controller 24 of the optical receiver 20 (operation S7). In addition, the processing ends.

Meanwhile, when it is determined that the divergence of the frequency distribution is not equal to or less than the predetermined value (see a route of "No" of operation S6), the transmission controller 19 changes the modulation characteristic by the optical modulator 14 to control the transmission characteristic (operation S8). In addition, the processing returns to operation S2.

Subsequently, an optical transmission/reception control operation in the optical communication system 1 of FIG. 11 will be described according to flowcharts (operations S11 to S26) illustrated in FIGS. 15 and 16. Herein, in FIG. 15, processing of operations S11 to S21 is illustrated, and in FIG. 16, processing of operations S22 to S26 is illustrated.

Figure 15:
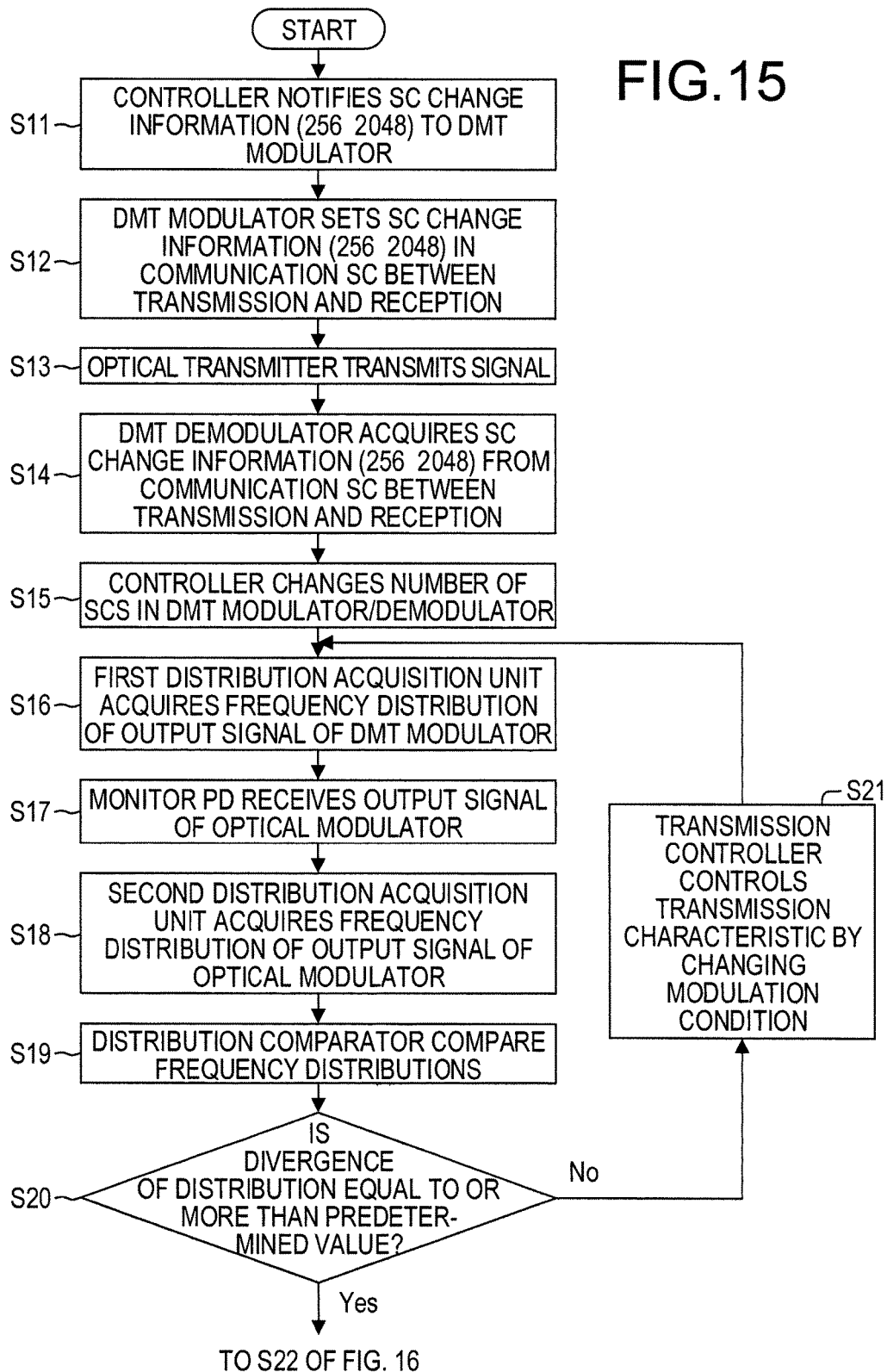
FIG. 15 is a flowchart for describing an optical transmission/reception control operation in the optical communication system of FIG. 11.

The controller 111 notifies subcarrier change information representing that the number of subcarriers increases, for example, from 256 to 2048 with respect to the DMT modulator 11 through the first subcarrier number controller 112 (operation S11 of FIG. 15).

The DMT modulator 11 sets the subcarrier change information representing that the number of subcarriers increases, for example, from 256 to 2048 with respect to communication subcarriers between transmission and reception (operation S12 of FIG. 15).

The optical transmitter 10 transmits the optical signal to the optical receiver 20 (operation S13 of FIG. 15).

The DMT demodulator 23 acquires SC change information representing that the number of subcarriers is changed, for example, from 256 to 2048 from a communication SC between transmission and reception of the transmitted optical signal (operation S14 of FIG. 15).

The controller 111 changes the number of subcarriers of the output signal in the DMT modulator 11 through the first subcarrier number controller 112 so that the number of subcarriers after change is applied to the same DMT signal.

Further, the controller 111 changes the number of subcarriers of the output signal in the DMT demodulator 23 through the second subcarrier number controller 24 so that the number of subcarriers after change is applied to the same DMT signal (operation S15 of FIG. 15).

The first distribution acquisition unit 15 acquires the frequency distribution of the output signal of the DMT modulator 11 (operation S16 of FIG. 15).

The monitor PD 16 receives the output signal of the optical modulator 14 (operation S17 of FIG. 15).

The second distribution acquisition unit 17 acquires the frequency distribution of the output signal of the optical modulator 14 (operation S18 of FIG. 15).

The distribution comparator 18 compares the frequency distribution of the output signal of the DMT modulator 11 and the frequency distribution of the output signal of the optical modulator 14 (operation S19 of FIG. 15).

The distribution comparator 18 determines whether the divergence of the frequency distribution is equal to or less than a predetermined value based on the comparison result (operation S20 of FIG. 15).

When it is determined that the divergence of the frequency distribution is not equal to or less than the predetermined value (see a route of "No" of operation S20), the transmission controller 19 changes a modulation condition by the optical modulator 14 to control the transmission characteristic (operation S21 of FIG. 15). In addition, the processing returns to operation S16 of FIG. 15.

Figure 16:
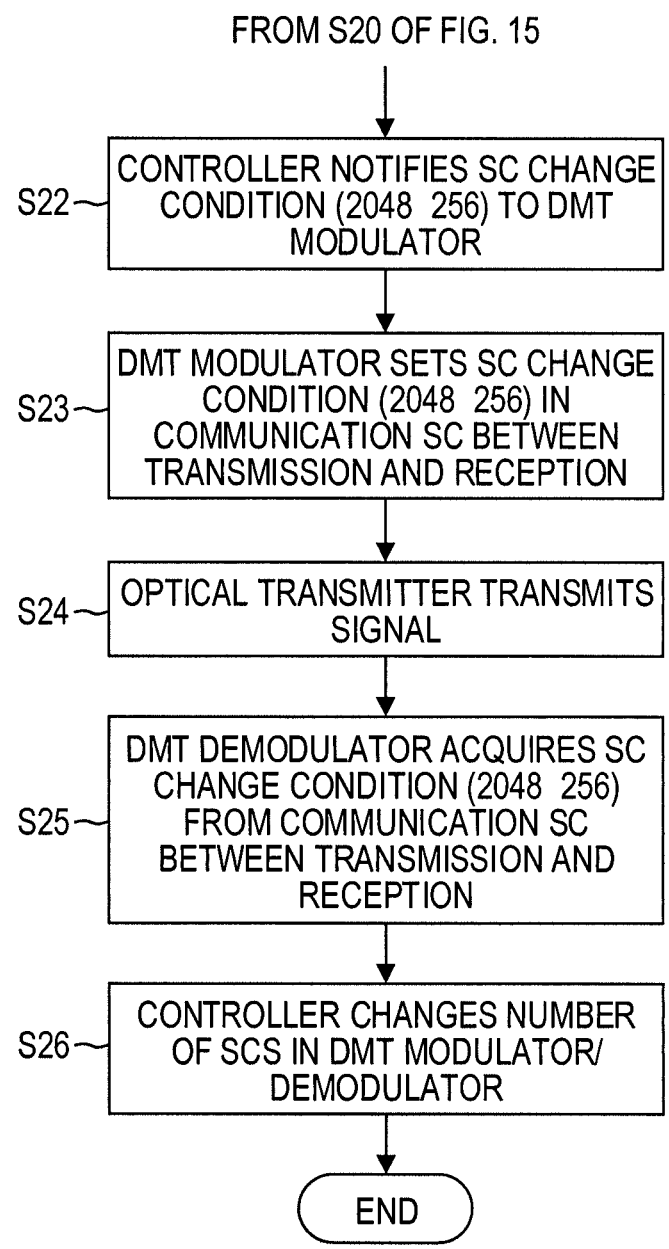
FIG. 16 is a flowchart for describing the optical transmission/reception control operation in the optical communication system of FIG. 11.

Meanwhile, the controller 111 notifies the subcarrier change information to change the number of subcarriers of the output signal to the DMT modulator 11 through the first subcarrier number controller 112 when it is determined that the divergence of the frequency distribution is equal to or less than the predetermined value (see a route of "Yes" of operation S20) (operation S22 of FIG. 16). The subcarrier change information notified in operation S22 of FIG. 16 represents that the number of subcarriers is returned, for example, from 2048 to 256.

The DMT modulator 11 sets the subcarrier change information representing that the number of subcarriers is returned, for example, from 2048 to 256 with respect to the communication subcarriers between transmission and reception (operation S23 of FIG. 16).

The optical transmitter 10 transmits the optical signal to the optical receiver 20 (operation S24 of FIG. 16).

The DMT demodulator 23 acquires the SC change information representing that the number of subcarriers is restored, for example, from 2048 to 256 from the communication SC between transmission and reception of the transmitted optical signal (operation S25 of FIG. 16).

The controller 111 changes the number of subcarriers of the output signal in the DMT modulator 11 through the first subcarrier number controller 112 so that the number of subcarriers after change is applied to the same DMT signal. Further, the controller 111 changes the number of subcarriers of the output signal in the DMT demodulator 23 through the second subcarrier number controller 24 so that the number of subcarriers after change is applied to the same DMT signal (operation S26 of FIG. 16). In addition, the processing ends.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. An optical transmitter comprising:
an optical modulator configured to modulate light having a predetermined wavelength into an optical signal based on a data signal;
a memory; and
a processor coupled to the memory and the processor configured to:
modulate an input signal into a multi-carrier signal so as to generate the data signal, the multi-carrier signal including a plurality of subcarriers each to which a transmission capacity is allocated;
acquire a first frequency distribution of an intensity of the multi-carrier signal;
acquire a second frequency distribution of an intensity of the optical signal;
control the modulating of the input signal into the multi-carrier signal to change a number of subcarriers of the multi-carrier signal; and
control the optical modulator to adjust a modulation characteristic of the optical modulator so that a divergence between the first frequency distribution and the second frequency distribution is equal to or less than a predetermined value.

2. The optical transmitter according to claim 1, wherein the processor is configured to adjust the modulation characteristic so that the second frequency distribution becomes a normal distribution.

3. The optical transmitter according to claim 1, wherein the processor is configured to notify an optical receiver receiving the optical signal of the number of subcarriers of the multi-carrier signal.

4. An optical communication system comprising:
an optical transmitter configured to include:
an optical modulator configured to modulate light having a predetermined wavelength into an optical signal based on a data signal;
a first memory; and
a first processor coupled to the first memory and the first processor configured to:
modulate an input signal into a multi-carrier signal so as to generate the data signal, the multi-carrier signal including a plurality of subcarriers each to which a transmission capacity is allocated;
acquire a first frequency distribution of an intensity of the multi-carrier signal;
acquire a second frequency distribution of an intensity of the optical signal;
control the modulating of the input signal into the multi-carrier signal to change a number of subcarriers of the multi-carrier signal;
control the optical modulator to adjust a modulation characteristic of the optical modulator so that a divergence between the first frequency distribution and the second frequency distribution is equal to or less than a predetermined value; and
transmit the number of subcarriers of the multi-carrier signal, and
an optical receiver configured to include:
an optical demodulator configured to demodulate the optical signal received from the optical transmitter;
a second memory; and a second processor coupled to the second memory and the second processor configured to control the optical demodulator based on the number of subcarriers of the multi-carrier signal.

5. The optical communication system according to claim 4,
wherein the first processor is configured to adjust the modulation characteristic so that the second frequency distribution becomes a normal distribution.

6. An optical transmission/reception control method comprising:
modulating an input signal into a multi-carrier signal so as to generate a data signal, the multi-carrier signal including a plurality of subcarriers each to which a transmission capacity is allocated, by a first processor;
modulating light having a predetermined wavelength into an optical signal based on the data signal, by an optical modulator;
acquiring a first frequency distribution of an intensity of the multi-carrier signal, by a first processor;
acquiring a second frequency distribution of an intensity of the optical signal, by a first processor;
controlling the modulating of the input signal into the multi-carrier signal to change a number of subcarriers of the multi-carrier signal, by a first processor;
controlling the optical modulator to adjust a modulation characteristic of the optical modulator so that a divergence between the first frequency distribution and the second frequency distribution is equal to or less than a predetermined value, by a first processor;
transmitting the number of subcarriers of the multi-carrier signal, by a first processor;
demodulating the optical signal, by an optical demodulator; and
controlling the optical demodulator based on the number of subcarriers of the multi-carrier signal, by a second processor.

7. The optical transmission/reception control method according claim 6,
wherein the first processor is configured to adjust the modulation characteristic so that the second frequency distribution becomes a normal distribution.

\* \* \* \* \*